United States Patent
Miller

(10) Patent No.: US 9,326,458 B1
(45) Date of Patent: May 3, 2016

(54) TREE TRUNK SNAIL SHIELD AND METHOD OF PREVENTING SNAILS FROM ACCESSING THE UPPER PORTIONS OF A TREE

(71) Applicant: William A. Miller, Moorpark, CA (US)

(72) Inventor: William A. Miller, Moorpark, CA (US)

(73) Assignee: WAMRAC, INC., Moorpark, CA (US)

( * ) Notice: Subject to any disclaimer, the term of this patent is extended or adjusted under 35 U.S.C. 154(b) by 0 days.

(21) Appl. No.: 14/674,421

(22) Filed: Mar. 31, 2015

(51) Int. Cl.
*A01M 1/10* (2006.01)
*A01G 13/10* (2006.01)

(52) U.S. Cl.
CPC .................................... *A01G 13/105* (2013.01)

(58) Field of Classification Search
CPC ....... A01G 13/10; A01G 13/105; A01M 1/10; A01M 1/103; A01M 1/18
USPC ...................... 43/108, 109, 120, 121; 47/32.5
See application file for complete search history.

(56) References Cited

U.S. PATENT DOCUMENTS

| | | | | |
|---|---|---|---|---|
| 204,561 A * | 6/1878 | Cook, et al. | ............. | A01M 1/18 43/108 |
| 205,721 A * | 7/1878 | Bowdoin | ................ | A01M 1/18 43/108 |
| 228,393 A * | 6/1880 | Richards | ................. | A01M 1/18 43/108 |
| 1,994,101 A * | 3/1935 | Hawkins | ................. | A01M 1/18 43/108 |
| 2,217,557 A * | 10/1940 | Macfee | .................... | A01M 1/18 43/108 |
| 4,268,992 A * | 5/1981 | Scharf, Sr. | ............. | A01G 13/02 47/21.1 |
| 2005/0081426 A1* | 4/2005 | Hsia | ....................... | A01M 29/30 43/124 |
| 2005/0241219 A1* | 11/2005 | Roberts | ................ | A01G 13/105 47/32.4 |

* cited by examiner

*Primary Examiner* — Peter M Poon
*Assistant Examiner* — Thien Thanh Pham
(74) *Attorney, Agent, or Firm* — James M. Duncan, Esq.; Klein DeNatale Goldner

(57) ABSTRACT

A device attaches to the trunks of plants and trees to prevent snails from reaching the upper portion of the plant or tree which has leaves and fruit subject to attack from the snails. Embodiments of the device have an inner funnel-shaped sleeve which biases against the tree trunk to provide a sufficiently tight closure to prevent snails from climbing between the trunk and the device. Embodiments of the device have a downward facing surface having a plurality of closely-spaced downwardly facing spike members. These spike members are sufficiently closely spaced so as to substantially or completely prevent snails, including small-sized young snails, from moving across the downwardly facing surface to crawl around the outside of the device to gain access to the upper portion of the tree.

9 Claims, 5 Drawing Sheets

TREE TRUNK SNAIL SHIELD AND METHOD OF PREVENTING SNAILS FROM ACCESSING THE UPPER PORTIONS OF A TREE

BACKGROUND OF THE INVENTION

This invention generally relates to methods and apparatus for preventing snails from damaging plants, trees, flowers, and fruit. This invention more particularly prevents snails from gaining access to the leaves, flowers, and fruit of large plants and trees. This invention further provides a platform for mounting irrigation emitters.

Snails can inflict severe damage to plants and trees, and to fruit growing on the plants and trees. With respect to trees, citrus trees and citrus fruit are especially susceptible to damage. Snails are most active at night, and will typically seek hiding places to avoid sun and bright light. Shady areas and areas with dense ground cover provide shelter for snails. Such shelters are frequently found in orchards. The conventional techniques for controlling snails include hand picking of the snails from foliage and ground surface, use of toxic snail baits, utilizing barriers, and traps. It is also known to utilize barriers on the trunks of trees and plants. All of the techniques have various levels of effectiveness, some more effective than others. However, many have various drawbacks as well with respect to expense, practicality, danger to young children and animals, and, with respect to traps, the unpleasant task of disposing of a large number of snails.

SUMMARY OF THE INVENTION

Embodiments of the present invention provide an effective apparatus which is specifically directed to preventing snails from gaining access to the portions of plants and trees which are above the apparatus. For purposes of this disclosure, the phrase "upper portions of the tree" shall refer to those portions of the tree which are above the device. When used in the present application, the terms up, upwardly, down and downwardly are made with respect to the ground surface, such that "upwardly" refers to the direction away from the ground surface, etc. The terms inwardly and outwardly are made with respect to tree trunk or plant trunk, such that "inwardly" refers to towards the trunk and "outwardly" refers to away from the trunk. The term "trunk" shall be understood to refer to trunks of both plants and trees, and the terms "plant" and "tree" shall be understood to be synonymous for purposes of this disclosure.

An embodiment of the present apparatus provides a barrier which encircles the trunk of a tree as a ring. This barrier comprises a downwardly facing surface which may comprise a plurality of closely-spaced downwardly facing spike members. These spike members are sufficiently closely spaced so as to substantially or completely prevent snails, including small-sized young snails, from moving across the downwardly facing surface. For example, the spike members may have a density of thirty spikes or more per square inch, such that the spaces between adjacent spikes might be smaller than one quarter inch.

The interior portion of the ring barrier comprises a plurality of adjacent radially disposed barrier members, the barrier members having an outside edge and an inside edge. These barrier members are configured such that the assembled group of barrier members form a funnel configuration, with the outside edges of the barrier members defining an outer rim when the barrier members are assembled together. An inner rim is defined by the assembled inside edges. The outside edges of each barrier member may be attached to a sleeve member to which the ring barrier is attached. When thus attached to the ring barrier, for an apparatus properly sized for a particular trunk, the inside edges of the barrier members will be biased against the outside surface of the tree. The side edges of each barrier member abut, or nearly abut, the side edges of the adjacent barrier member. Thus configured, the assembled barrier members join tightly about the trunk, preventing snails from crawling between the ring barrier and the tree, or from crawling between adjacent barrier members.

Embodiments of the ring barrier are fabricated from relatively flexible plastic materials, which allow the memory of the material to provide the necessary biasing properties such that the barrier members will remain biased against the tree trunk. The ring barriers must also allow the ring barrier to be opened so that it may be placed about a tree trunk. In one embodiment of the ring barrier, the device is a single piece having one portion of the ring in which the ring opens at a break to allow it to be slipped around the tree trunk. This embodiment will include closure structure, such as pins on one side of the break and holes on the other side of the break, where the pins engage the holes to close and lock the ring around the tree trunk. Other embodiments of the device, the ring barrier may be fabricated from several arc-shaped sections, where the arc-shaped sections are connected together to form the ring.

Embodiments of the device may further comprise attachment strips which allow the device to be secured to a tree trunk with nails or screws. Embodiments of the device may further comprise apertures for inserting and anchoring irrigation emitters. For this embodiment, the device provides a secure platform for anchoring irrigation emitters and directing water away from the trunk or base of the tree. Water can cause problems when sprayed directly onto the trunks of citrus trees. The present invention keeps the emitters above the ground and provides an irrigation point which delivers water away from the base of the tree in a desirable pattern.

DETAILED DESCRIPTION OF THE INVENTION

Figure 1:
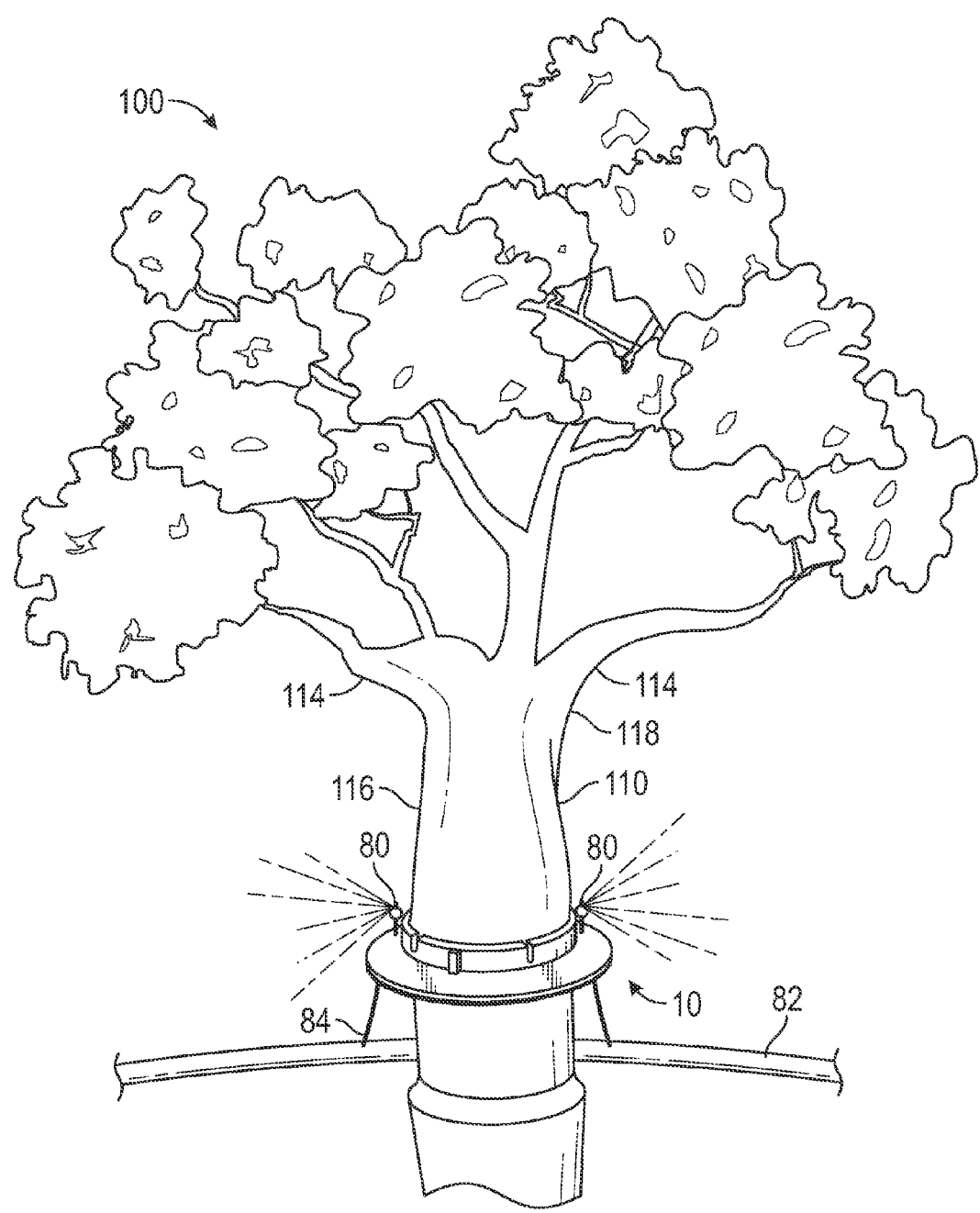
FIG. 1 shows an embodiment of the invention as installed on a tree trunk.

Referring now to the figures, FIG. 1 shows a tree 100 having a trunk 110. As shown in FIG. 1, embodiments of the disclosed shield 10 attach to a lower section of trunk 110 by encircling the trunk. As indicated in FIG. 1, the shield 10 will typically be installed beneath the point of the trunk 110 from which major branches 114 begin to grow out from the trunk. This section of trunk 110 which is below the major branches 114 shall be referred to as the lower section 116 of the trunk. The section of trunk 110 from which the major branches 114 begin or, alternatively, the section of trunk above the point where the shield 10 is installed, shall be referred to as the upper section 118 of the trunk. The shield 10 encircles the trunk 110 and provides a barrier which prevents snails from gaining access to the upper section 118 of the tree 100.

The embodiment of the shield 10 depicted in FIG. 1 serves a secondary purpose of providing a platform for mounting irrigation emitters 80 which are connected to water line 82 by irrigation tubing 84. Irrigation emitters 80 may be inserted into apertures 86 which are placed in ring 12.

FIGS. 2-5 show different views of an embodiment of shield 10. This embodiment of shield 10 has a ring 12 which has a bottom 14 and a top 16. The ring 12 has an inside circular edge 18 and an outside circular edge 20. The bottom 14 has a lower face 22 which extends between the inside circular edge 18 and the outside circular edge 20. The top 16 has an upper face 24 which also extends between the inside circular edge 18 and the outside circular edge 20.

Figure 3:
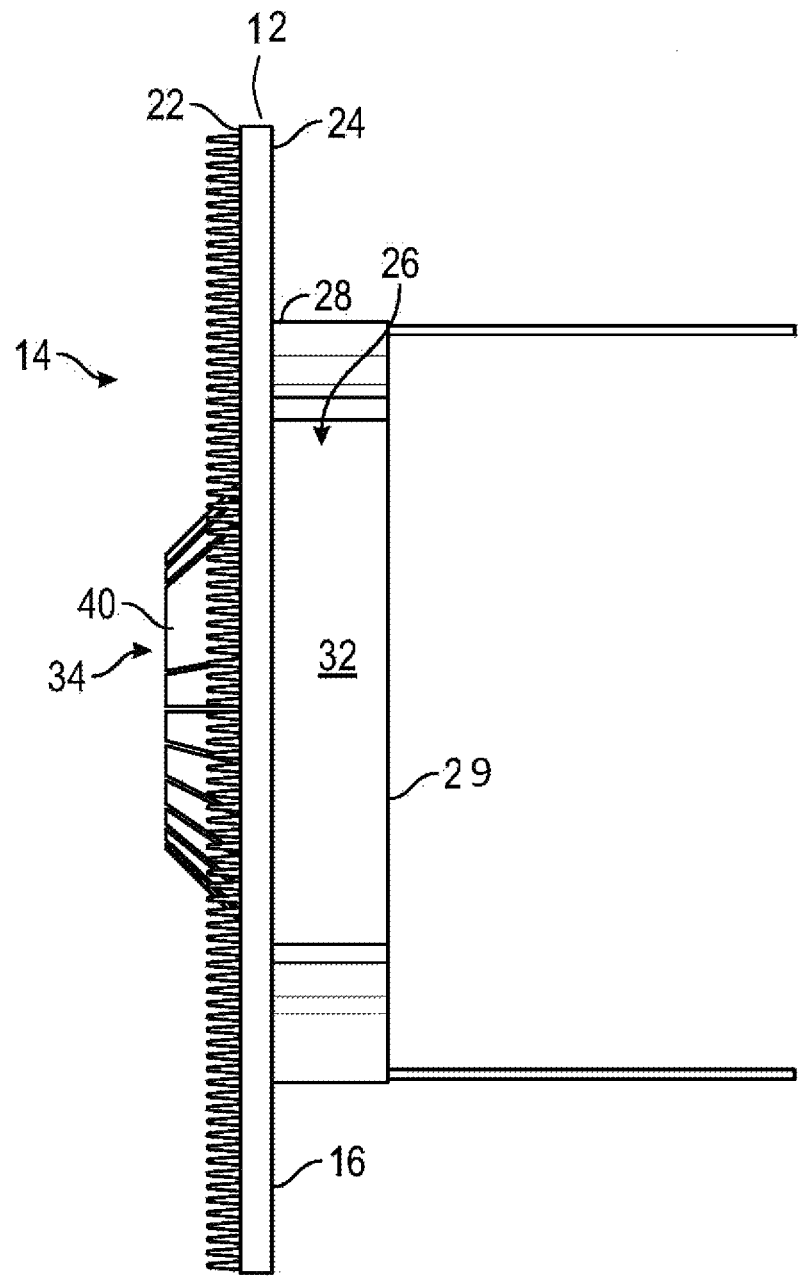
FIG. 3 shows a side view of an embodiment of the present invention.

This embodiment of shield 10 has a circular sleeve member 26 which coincides and extends from the inside circular edge 18. The circular sleeve member 26 has a proximate edge 28 which is adjacent or in engaging contact with upper face 24. Circular sleeve member 26 also has a distal edge 29 which extends upwardly away from the upper face 24. The circular sleeve member has a surface 30 which faces inwardly (the "inward facing surface") and a surface 32 which faces outward (the "outward facing surface"). As best shown in FIG. 3, the outward facing surface 32 is generally perpendicular to upper face 24.

Figure 2:
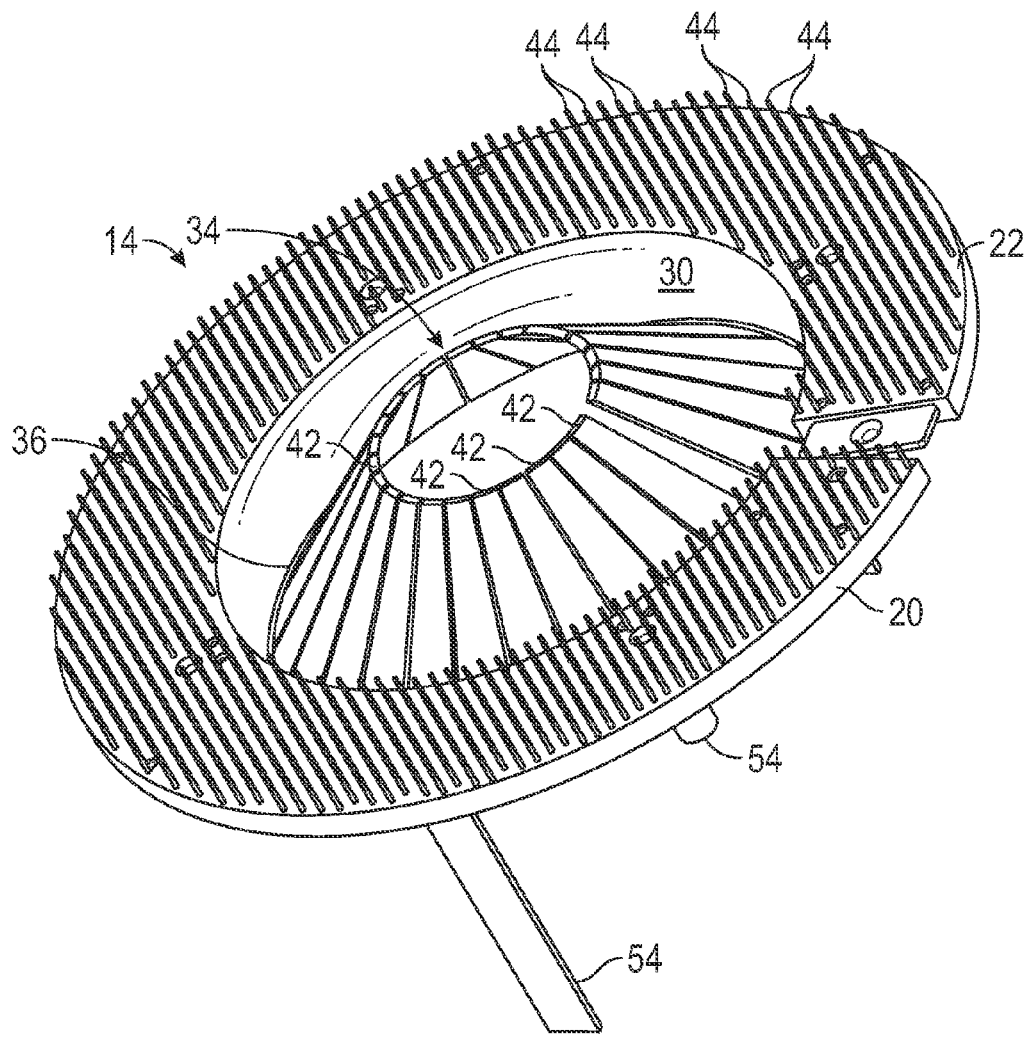
FIG. 2 shows a perspective view, looking towards the bottom, of an embodiment of the present invention.
Figure 4:
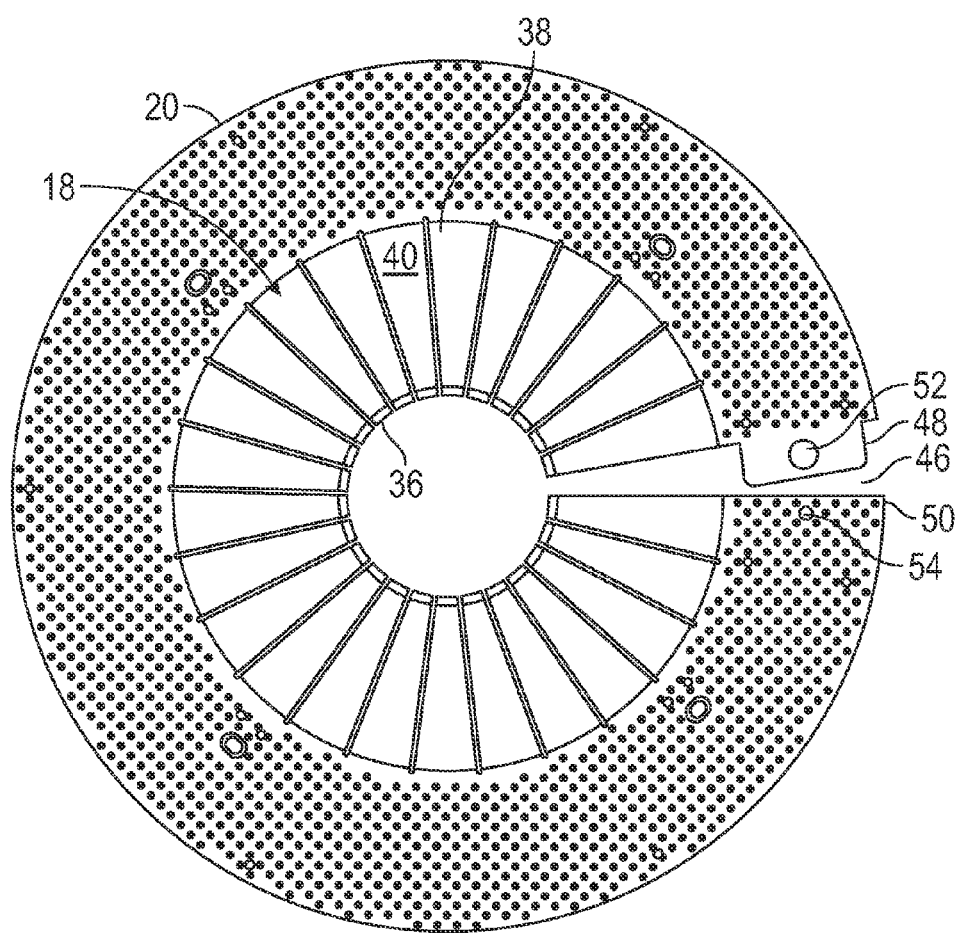
FIG. 4 shows a bottom view of an embodiment of the present invention.
Figure 5:
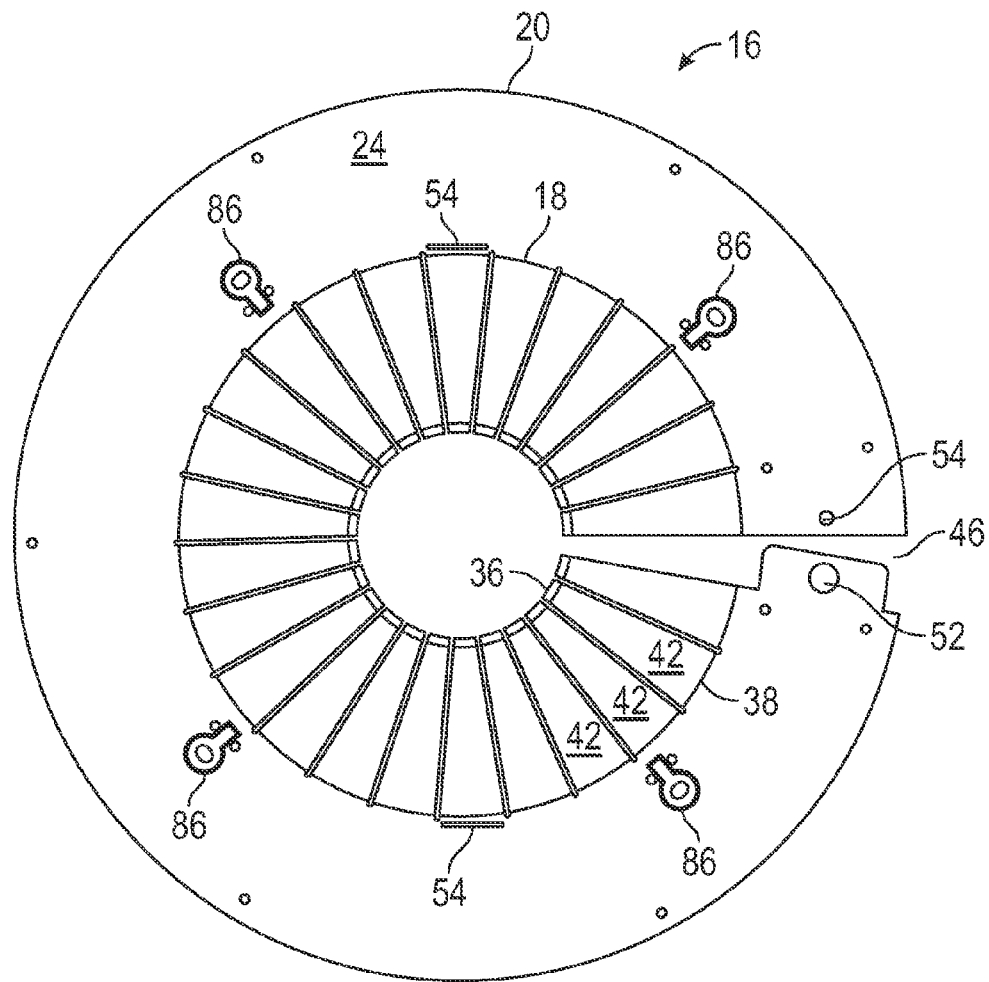
FIG. 5 shows a top view of an embodiment of the present invention.

This embodiment of shield 10 also comprises a funnel member 34. As best shown in FIG. 4, funnel member 34 has a small diameter rim 36 and a large diameter rim 38. The large diameter rim 38 is coupled, molded with, or otherwise attached to the inward facing surface 30. Funnel member 34 further comprises a funnel surface 40 which extends between the large diameter rim 38 and the small diameter rim 36. As shown in FIGS. 2-3, large diameter rim 38 is positioned adjacent to the distal edge 29 of circular sleeve member 26 and small diameter rim 36 extends axially toward the lower face 22. Funnel member 34 may comprise a plurality of adjacent radially disposed barrier members 42. Radially disposed barrier members 42 have outside edges which define large diameter rim 38. Radially disposed barrier members 42 have inside edges which define small diameter rim 36.

Small diameter rim 36 forms an opening which is sized to encircle trunk 110. Shield 10 may be fabricated from thermoplastic materials through injection molding or other known processes. The material properties of the plastic matrix forming shield 10 should be such that the radially disposed barrier members 42 which make up small diameter rim 36 are naturally biased. It is desired that when installed on a tree trunk 110, that the inside edges of radially disposed barrier members 42 are abutting against the tree trunk 110, with the memory of the thermoplastic material biasing the radially disposed barrier members 42 against the trunk 110. This configuration provides a sufficient seal between the trunk 110 and the small diameter rim 36 to prevent snails from getting above the shield 10 and thus gaining access to the upper section 118 of the trunk 110.

Lower face 22 may comprise a plurality of closely-spaced downwardly facing spike members 44. These spike members 44 are sufficiently closely spaced so as to substantially or completely prevent snails, including small-sized young snails, from moving across the downwardly facing surface of lower face 22. For example, the spike members 44 may have a density of thirty spikes or more per square inch, such that the spaces between adjacent spikes might be smaller than one quarter inch.

In order to be installed around a tree trunk 110, embodiments of the shield 10 must have at least one break 46 which allows the ring 12 to be twisted or spread to open up a space between the two sides of the break so the device can be placed around the trunk 110. Break 46 will have a first side 48 and a second side 50. Various structures known in the art may be utilized with break 46 to attach first side 48 to second side 50 once the shield 10 has been placed around trunk 110. By way of example, first side 48 may comprise an aperture 52 and second side 50 comprises a pin 52. Other combinations of pins, apertures, buckles, clips, etc. may be utilized to close and lock the shield 10 around tree trunk 110.

Embodiments of the shield 10 may further comprise various structures to prevent the shield 10 from sliding downward on trunk 110. For example, shield 10 may comprise attachment strips 54 which extend upwardly from the circular sleeve member 26. Attachment strips 54 may then be attached to trunk 110 by nails, screws, or other fasteners.

Having thus described the preferred embodiment of the invention, what is claimed as new and desired to be protected by Letters Patent includes the following:

1. In a tree having a trunk, an apparatus attaches to a lower section of the trunk and prevents mollusks from gaining access to an upper section of the trunk above the apparatus, wherein the apparatus comprises:

a ring for generally horizontal disposition about the trunk, the ring having a top, a bottom, an inside circular edge and an outside circular edge concentric with the inside circular edge, wherein a lower generally horizontal face is defined on the bottom extending between the inside circular edge and the outside circular edge and an upper generally horizontal face is defined on the top extending between the inside circular edge and the outside circular edge;

a circular sleeve member coinciding and extending from the inside circular edge, the circular sleeve member having a proximate edge adjacent to the upper face and a distal edge extending upwardly from the upper face, the circular sleeve member having an inward facing surface and an outward facing surface, the outward facing surface generally perpendicular to the upper face; and a funnel member having a large diameter rim and a small diameter rim, the large diameter rim coupled to the inward facing surface, wherein the funnel member comprises a funnel surface which extends inwardly from the large diameter rim to the small diameter rim, wherein the large diameter rim is positioned adjacent to the distal edge of the circular sleeve member and the small diameter rim extends toward the lower face, wherein the small diameter rim is sized to encircle the trunk of the tree, wherein the funnel member comprises a plurality of immediately adjacent radially disposed barrier members, each barrier member having an outside edge and an inside edge, wherein the outside edges of the barrier members combine to form the large diameter rim and the inside edges of the barrier members combine to form the small diameter rim.

2. The apparatus of claim 1 wherein the lower face comprises a plurality of closely-spaced downwardly facing spike members.

3. The apparatus of claim 2 wherein the spike members have a spike density of at least thirty spikes per square inch.

4. The apparatus of claim 1 wherein the apparatus is molded from plastic materials as a single piece.

5. The apparatus of claim 4 wherein a break extends through the ring, circular sleeve member, and the funnel member, wherein the apparatus may be placed around the trunk of the tree by spreading the break apart and slipping the apparatus around the trunk.

6. The apparatus of claim 5 wherein the break has a first side and a second side, and the first side comprises a pin and the second side comprises an aperture into which the pin fits, the pin and aperture providing a closing structure for the break.

7. The apparatus of claim 1 further comprising attachment strips extending upwardly from the circular sleeve member for attachment of the apparatus to the tree trunk.

8. The apparatus of claim 1 further comprising an aperture extending from the lower face through the upper face.

9. The apparatus of claim 8 further comprising an irrigation emitter disposed within the aperture.

* * * * *